United States Patent [19]
Moore

[11] Patent Number: 6,163,598
[45] Date of Patent: Dec. 19, 2000

[54] INTERACTIVE GRAPHIC PAYPHONE

[75] Inventor: Robert Gregory Moore, Calgary, Canada

[73] Assignee: Nortel Networks Limited, Montreal, Canada

[21] Appl. No.: 08/998,553

[22] Filed: Dec. 24, 1997

[51] Int. Cl.[7] .................................................. H04M 11/00
[52] U.S. Cl. .................................. 379/93.23; 379/93.22; 379/110.01; 379/90.01; 379/119
[58] Field of Search .............................. 379/90.01, 93.12, 379/93.17–93.28, 110.01, 111, 112, 116, 119

[56] References Cited

U.S. PATENT DOCUMENTS

| | | | |
|---|---|---|---|
| 4,797,914 | 1/1989 | Vaello | 379/93.22 |
| 5,327,554 | 7/1994 | Palazzi, III et al. | 379/93.25 |
| 5,812,647 | 9/1998 | Beaumont et al. | 379/111 |

FOREIGN PATENT DOCUMENTS

| | | | |
|---|---|---|---|
| 0344672 | 12/1989 | European Pat. Off. | 379/93.25 |
| 0502246 | 9/1992 | European Pat. Off. | 379/93.01 |

*Primary Examiner*—Wing F. Chan
*Attorney, Agent, or Firm*—Cobrin & Gittes

[57] ABSTRACT

An apparatus for displaying graphical information at a plurality of sites. The apparatus includes a graphical content server and a plurality of graphical display telephones. The graphical content server includes a processor for creating graphical content files defining graphical information to be displayed at the plurality of sites and a transmitter for transmitting the graphical content files to respective graphical display telephones at the plurality of sites. Each graphical display telephone includes a receiver for receiving graphical data from the graphical content server, memory for storing the graphical data in a display buffer in the telephone and a graphical display for displaying the graphical data stored in the display buffer.

54 Claims, 11 Drawing Sheets

RAM CONFIGURATION

PSK RECEIVE BUFFER

FSK RECEIVE BUFFER

CALL DETAIL RECORD BUFFER

DISPLAY BUFFER

PRINT BUFFER

FLASH MEMORY CONFIGURATION

DISPLAY FILES

PROGRAM FILES

RATE TABLE

INTERACTIVE GRAPHIC PAYPHONE

FIELD OF THE INVENTION

This invention relates to apparatus, methods and systems for distributing graphical information to a plurality of pay telephones at a plurality of remotely located sites.

BACKGROUND OF THE INVENTION

Pay telephones currently exist with a conventional two-line vacuum florescent display for displaying information about telephone calls. When a pay telephone is not in use, the conventional two-line display is often used to display or scroll text which may be used for advertising to attract a user to the telephone. The use of text-only information produces a rather uninteresting advertising format and furthermore, such information is pre-stored in the telephone at the time of manufacture or during a service call.

With the advent of the use of graphic displays in pay telephones, and with the use of the ADSI communications capabilities, advertising can be made more interesting.

In addition, telephone service providers such as the Talking Yellow Pages (tm) currently provide information in an audio format to the users making requests of such services. Use of such services, however, is valuable to only those who are satisfied in receiving data in an audio format. However, some of such information may be presented rather quickly and can be difficult to write down, for example, exchange rate information or directory assistance information. It would, therefore, be desirable to allow a user to observe such information on a graphical screen. Users of public telephones frequently need a means of recording information provided by a Directory Assistance (DA) service, and there is a growing requirement for the user to make and retain a record of each call placed, for accounting and other purposes.

At best, a user is equipped with a pen or pencil and paper to make appropriate notes. Other users will be forced to depend upon memory, which can result in the dialling of incorrectly remembered numbers and consequently, necessary expenses. Worse, some users may record the information by means of a knife or other sharp object, thus causing damage to the telephone booth or worse.

There are situations where even a user equipped with pencil and paper will have difficulties, for example where several possible numbers match the criteria provided to the DA service.

This invention reduces the impact of these problems and shortcomings by providing the user with a printed, hardcopy record containing the number provided by the DA service, the details of a call transaction, or of other information that may be appropriately submitted to or gathered by the telephone network, and subsequently delivered via the same means.

SUMMARY OF THE INVENTION

In accordance with one aspect of the invention, there is provided a method of displaying graphical content on a telephone. The method includes the steps of receiving graphical data from a content server, storing the graphical data in a display buffer in the telephone, and displaying the graphical data stored in the display buffer, on a display on the telephone.

Preferably, the method includes the step of storing the graphical data in a display file.

Preferably, the method includes the step of displaying the graphical data at pre-defined periods of time.

Preferably, the method includes the step of placing a telephone call to the content server to request the graphical data.

Preferably, the method includes the step of placing the telephone call at pre-determined intervals of time.

Preferably, the method includes the step of receiving the graphical data in a phase shifted keyed format.

Preferably, the method includes the step of receiving the graphical data in a frame according to a pre-defined protocol including an identifier for identifying the frame as relating to graphical data.

Preferably, the method includes the step of obtaining and storing the graphical data from a frame.

Preferably, the method includes the step of obtaining and storing attribute data relating to the graphical data from a frame.

In accordance with another aspect of the invention, there is provided an apparatus for displaying graphical content on a telephone. The apparatus includes a receiver for receiving graphical data from a content server, memory for storing the graphical data in a display buffer in the telephone and a display for displaying the graphical data stored in the display buffer.

Preferably, the display buffer includes a display file.

Preferably, the apparatus includes a processor programmed to cause the graphical data to be displayed on the display at pre-defined periods of time.

Preferably, the apparatus includes a telephone line interface in communication with the processor, the processor being programmed to direct the telephone line interface to place a telephone call to the content server to request the graphical data.

Preferably, the processor is programmed to direct the telephone line interface to place the telephone call to the content server at pre-determined intervals of time.

Preferably, the apparatus includes a transmitter for transmitting a request message through the telephone line interface to the content server.

Preferably, the receiver receives the graphical data in a phase shift keyed format.

In accordance with another aspect of the invention, there is provided a method of displaying graphical information at a plurality of sites. The method includes the steps of creating graphical content files defining graphical information to be displayed at the plurality of sites and transmitting the graphical content files to respective graphical display telephones.

Preferably, the method includes the step of transmitting the graphical content files over a public switched telephone network.

Preferably, the method includes the step of creating bit-mapped graphical content files.

Preferably, the method includes the step of receiving a request for graphical content from at least one of the telephones and performing the step of transmitting in response to the request for graphical content.

Preferably, the method includes the step of establishing a telephone call between a graphical content provider and at least one graphical display telephone.

Preferably, the method includes the step of associating the graphical content files with respective graphical display telephones.

In accordance with another aspect of the invention, there is provided an apparatus for displaying graphical information at a plurality of sites. The apparatus includes a processor for creating graphical content files defining graphical information to be displayed at the plurality of sites, and a transmitter for transmitting the graphical content files to respective graphical display telephones at the plurality of sites.

Preferably, the transmitter is operable to establish a telephone call to at least one of the graphical display telephones on a public switched telephone network.

Preferably, the graphical content files include bit-mapped graphical content files.

Preferably, the apparatus includes a receiver for receiving a request for graphical content from at least one of the telephones, the processor being programmed to transmit at least one of the graphical content files to the at least one of the telephones in response to receiving the request for graphical content.

Preferably, the processor is programmed to associate the graphical content files with respective graphical display telephones.

In accordance with another aspect of the invention, there is provided a method of displaying graphical information at a plurality of sites. The method includes the steps of creating graphical content files defining graphical information to be displayed at the plurality of sites, transmitting the graphical content files to respective graphical display telephones at the plurality of sites, from a graphical content server, receiving graphical data from the content server at graphical display telephones at respective sites, storing the graphical data in a display buffer in the respective graphical display telephones and displaying the graphical data stored in the display buffers of the graphical display telephones.

Preferably, the method includes the step of storing the graphical data at the graphical display telephone in a display file.

Preferably, the method includes the step of displaying the graphical data at the graphical display telephone at pre-defined periods of time.

Preferably, the method includes the step of placing a telephone call from at least one of the graphical display telephone to the content server to request the graphical data.

Preferably, the method includes the step of placing the telephone call at pre-determined intervals of time. Preferably, the method includes the step of receiving the graphical data at the graphical display telephone in a phase shifted keyed format.

Preferably, the method includes the step of receiving at the graphical display telephone the graphical data in a frame according to a pre-defined protocol including an identifier for identifying the frame as relating to graphical data.

Preferably, the method includes the step of obtaining and storing the graphical data from a frame.

Preferably, the method includes the step of obtaining and storing attribute data relating to the graphical data from a frame.

Preferably, the method includes the step of transmitting the graphical content files from the graphical content server over a public switched telephone network.

Preferably, the method includes the step of creating bit-mapped graphical content files at the graphical content server.

Preferably, the method includes the step of receiving a request for graphical content at the graphical content server, from at least one of the telephones and performing the step of transmitting the graphical content files in response to the request for graphical content.

Preferably, the method includes the step of establishing from at least one of the graphical display telephone a telephone call to the graphical content provider.

Preferably, the method includes the step of associating the graphical content files with respective graphical display telephones, at the graphical content server.

In accordance with another aspect of the invention, there is provided an apparatus for displaying graphical information at a plurality of sites. The apparatus includes a graphical content server and a plurality of graphical display telephones. The graphical content server includes a processor for creating graphical content files defining graphical information to be displayed at the plurality of sites and a transmitter for transmitting the graphical content files to respective graphical display telephones at the plurality of sites. Each graphical display telephone includes a receiver for receiving graphical data from the graphical content server, memory for storing the graphical data in a display buffer in the telephone and a graphical display for displaying the graphical data stored in the display buffer.

Preferably, the display buffer includes a display file.

Preferably, the apparatus includes a processor at, at least, one graphical display telephone programmed to cause the graphical data to be displayed on the display at pre-defined periods of time.

Preferably, the apparatus includes a telephone line interface at, at least one graphical display telephone in communication with the processor, the processor being programmed to direct the telephone line interface to place a telephone call to the content server to request the graphical data.

Preferably, the processor is programmed to direct the telephone line interface to place the telephone call to the content server at pre-determined intervals of time.

Preferably, the apparatus includes a transmitter at, at least, one graphical display telephone for transmitting a request message through the telephone line interface to the content server.

Preferably, the receiver at the graphical display telephone receives the graphical data in a phase shift keyed format. Preferably, the transmitter at the graphical display telephone is operable to establish a telephone call to the content server on a public switched telephone network.

Preferably, the graphical content files include bit-mapped graphical content files.

Preferably, the apparatus includes a receiver at the graphical content service for receiving a request for graphical content from at least one of the telephones, the processor at the graphical content server, being programmed to transmit at least one of the graphical content files to the telephones in response to receiving the request for graphical content.

Preferably, the processor at the graphical content server is programmed to associate the graphical content files with respective graphical display telephones.

BRIEF DESCRIPTION OF THE DRAWINGS

In drawings which illustrate embodiments of the invention,

FIG. 8b is a continuation of FIG. 8a;

DETAILED DESCRIPTION

FIG. 1

Figure 1:
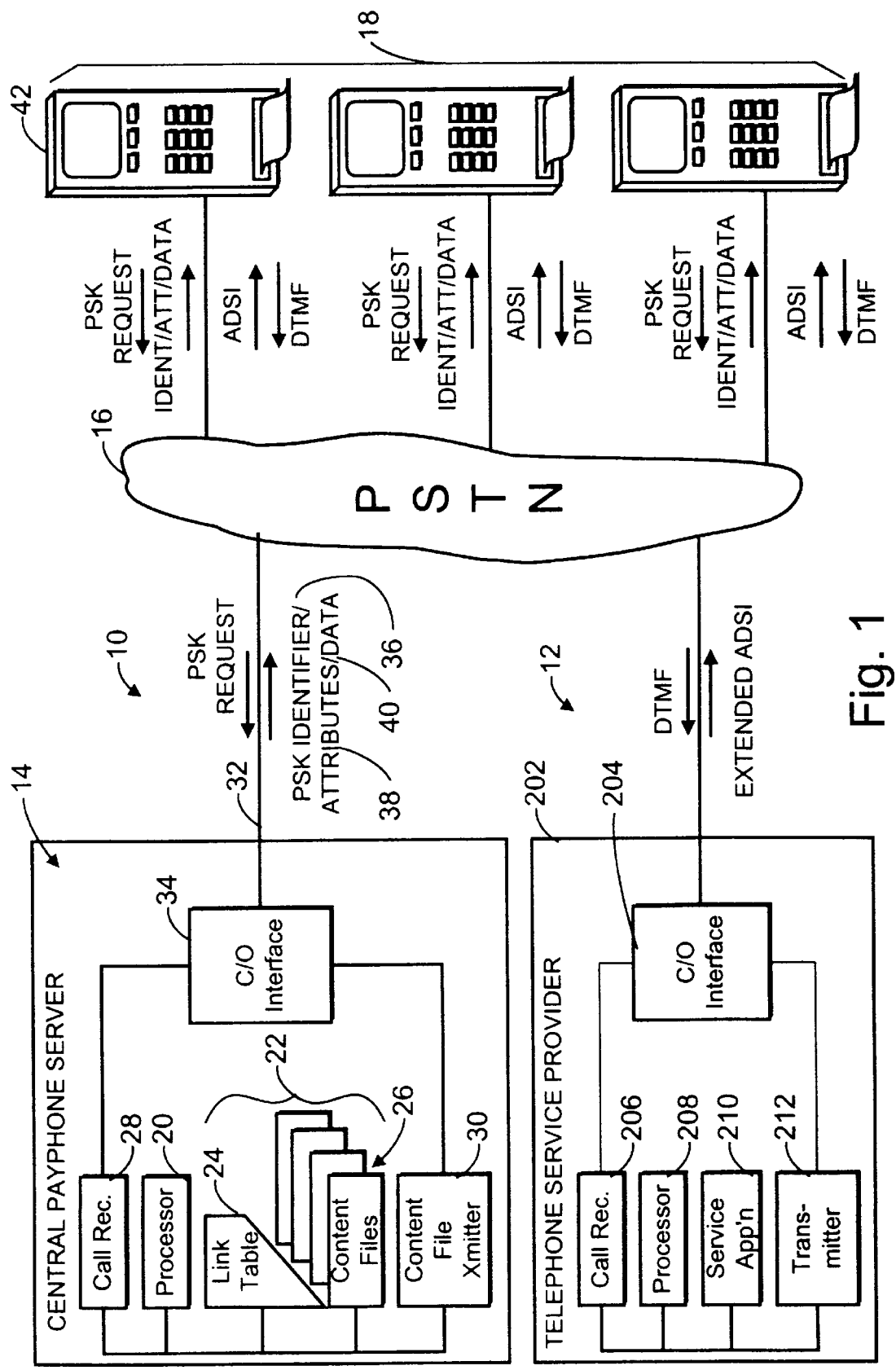
FIG. 1 is a block diagram of a system according to a first embodiment of the invention.

Referring to FIG. 1, a system for providing graphical content to a plurality of graphical display pay telephones at respective sites is shown generally at 10. In addition, a system for providing telephone information services by telephone is shown generally at 12.

The system 10 includes a graphical content server which in this embodiment is a central payphone server 14, a public switched telephone network (PSTN) 16 and a plurality of graphical display telephones shown generally at 18. Both the central payphone server 14 and each of the plurality of telephones 18 is operable to communicate with each other via the public switched telephone network 16.

The central payphone server 14 includes a processor 20 which is connected to memory shown generally at 22 structured to include a link table 24, content files 26 including graphical files and rate tables. In addition, the processor 20 is in communication with a call receiver 28 and a content file transmitter 30. The call receiver 28 and the content file transmitter 30 are operable to receive and transmit PSK data over a subscriber loop 32 through a central office line interface 34. Thus the graphical content server includes a processor for creating graphical content files defining graphical information to be displayed at the plurality of sites and a transmitter for transmitting the graphical content files to respective graphical display telephones at the plurality of sites.

The processor 20 is operable to receive from an external source, not shown, separate graphical content files 26 for each respective telephone of the plurality of telephones 18. Thus, each telephone is associated with a corresponding set of graphical content files and rate table files. The processor 20 uses the link table to establish correlations of graphical content files and rate table files with individual telephones of the plurality of telephones 18. Thus, the processor at the graphical content server is programmed to associate the graphical content files with respective graphical display telephones.

The call receiver 28 receives PSK signals from the central office line interface 34, such PSK signals being interpreted as requests for specific content files from the memory 22. In response to such requests, the processor 20 retrieves a content file 26 as determined from the link table 24 and transmits the content file 26 using the content file transmitter 30 through the central office line interface 34, as a phase shift keyed (PSK) information message. Thus, the call receiver 28 acts as a receiver at the graphical content service provider for receiving a request for graphical content from at least one of the telephones, the processor at the graphical content server, being programmed to transmit at least one of the graphical content files to the at least one of the telephones in response to receiving the request for graphical content.

The PSK message includes an identifier field 36, an attribute field 38 and a data field 40. The identifier field 36 identifies the message as a graphical or rate table message, the attribute field 38 identifies certain attributes of graphical files such as time for display, effective date of display, etc. and the data field in the case of graphical files includes a bit map file for controlling pixels on a display of the telephone which sent the PSK request message. Thus, the graphical content files include bit-mapped graphical content files. In the case of rate table files, the data field includes rate information associated with the requesting telephone. The public switched telephone network conveys the PSK message to the requesting telephone, telephone 42 for example.

FIG. 2

Figure 2:
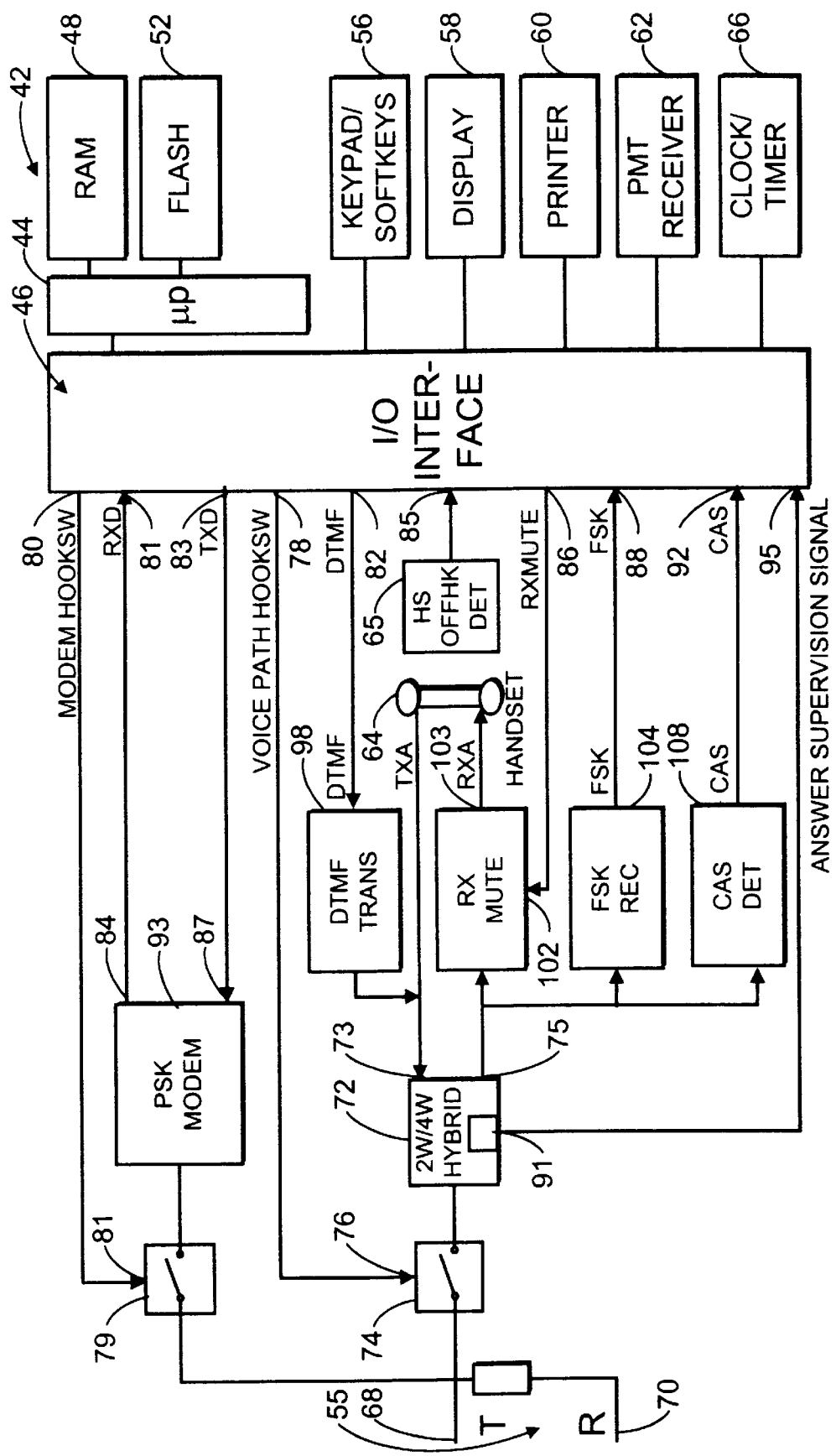
FIG. 2 is a block diagram of a telephone apparatus according to the first embodiment of the invention.

Referring to FIG. 2, the telephone includes a second processor 44 in communication with an input/output (I/O) interface 46, Random Access Memory (RAM) 48, and flash memory 52. The I/O interface 46 is in communication with a central office line interface shown generally at 54, a keypad soft key interpreter 56, a display 58, a printer 60, a payment receiver 62, a handset 64, and a clock timer 66.

The I/O interface 46 has a modem hookswitch output 80, a Receive Data (RXD) input 81, a Transmit Data (TXD) output 83, a voice path hookswitch output 78, a DTMF output 82, a handset offhook detect input 85, an RX mute output 86, an FSK input 88 a CAS input 92, and an answer supervision signal input 95.

The central office line interface 54 interfaces the I/O interface 46 with a central office line 55. The central office line interface includes a PSK modem 93 and a PSK modem hookswitch 79. The PSK modem hookswitch 79 is connected to tip and ring terminals 68 and 70 and is operable to connect the PSK modem 93 for communication through the central office line 55. The PSK modem hookswitch 79 has a control input 81 connected to the modem hookswitch output 80 such that the I/O interface 46 is operable to control the connection of the PSK modem 93 to the central office line 55. The PSK modem 93 has a receive signal output 84 and a transmit signal input 87 which are connected to the RXD input 81 and TXD output 83 respectively of the I/O interface 46 to facilitate reception and transmission of data using the PSK modem 93.

The central office line interface 54 further includes a voice path hookswitch 74, a 2-wire to 4-wire hybrid 72, a DTMF transmitter 98, an RX mute circuit 102, a handset 64, a handset offhook detector 65, an FSK receiver 104 and a CAS detector 108. The voice path hookswitch 74 is operable to connect the 2-wire to 4-wire hybrid 72 to the central office line. The voice path hookswitch 74 has a control input 76 which is connected to the voice path hookswitch output 78 which allows the processor to control the voice path hookswitch 74 through the I/O interface 46. The 2-wire to 4-wire hybrid 72 has a voice transmit input 73 and a receive output 75. The DTMF transmitter 98 receives signals from the DTMF output 82 which cause it to present DTMF tones to the transmit signal input 73 for transmission over the central office line 55 under control of the processor 44. The handset 64 is also operable to produce voice transmit signals which are received at the input 73, also for transmission over the central office line 55.

The receive output 75 is connected to the receive mute circuit (RX) 102 and the receive (RX) mute circuit 75 has an output 103 which provides a receive signal to the handset 64. The RX mute circuit 75 is controlled by the RX mute output 86 of the I/O interface 46 to selectively mute and unmute the receive path between the 2-wire to 4-wire hybrid and the handset 64.

The hybrid 72 includes an answer supervision circuit 71 which produces an active answer supervision signal to the answer supervision signal input 95 on the I/O interface 46.

The handset offhook detector 65 provides an active handset offhook detect signal to the handset offhook detect input 85 when the user lifts the handset 64 off of a cradle (not shown).

The FSK receiver 104 is connected to receive signals from the receive output 75 and to present data representing FSK transmissions so received to the FSK input 88 at the I/O interface 46.

The CAS detector 108 is connected to the 2-wire to 4-wire hybrid 72 to receive signals from the receive output 75. The CAS detector 108 produces an active CAS detect signal which is applied to the CAS input 92 of the I/O interface 46. The CAS detect signal is rendered active when a caller alerting signal CAS is received from the central office. The keypad soft key interpreter 56 provides signals to the second processor 44 indicative of keys pressed on a dial keypad of the telephone or on softkeys adjacent the display 58. The display is a 3 inch by 4 inch pixel addressable display.

The printer 60 is a small receipt type printer similar to that found on cash registers.

The payment receiver 62 is a hybrid credit card and smart card receiver, in this embodiment, and includes credit card validation software and hardware, etc., and credit card reading apparatus for reading a credit or IC-based smart card. Effectively, the payment receiver 62 renders a payment signal active when a valid credit card (not shown) has been inserted into the credit card reader (not shown) and the credit card has been validated.

The handset 64 is conventional and allows the user to send and receive voice signals in the usual manner over the central office line.

The clock timer 66 provides time of day information, date information and timing information to the second processor 44.

FIG. 3

Figure 3:
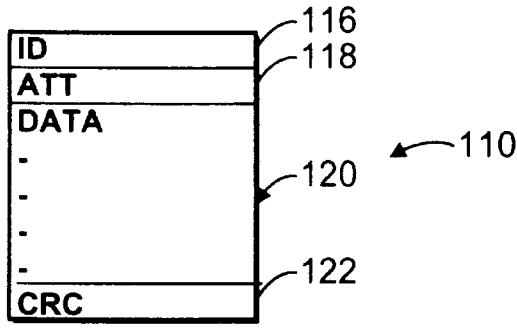
FIG. 3 is a schematic representation of a random access memory configuration, according to the first embodiment of the invention.
Figure 3:
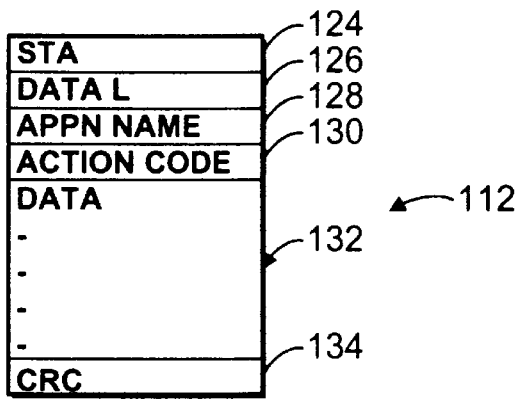
Figure 3:
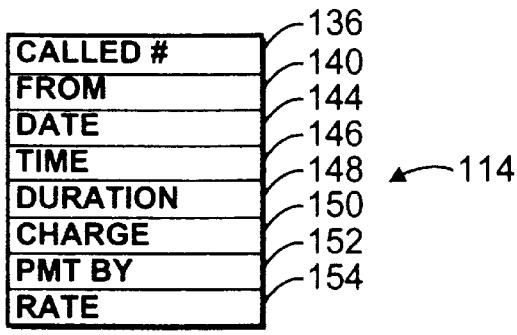
Figure 3:
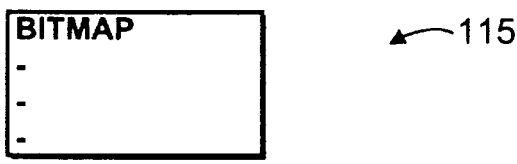
Figure 3:

Referring to FIG. 3, the RAM is configured to include a PSK receive buffer 110, an FSK receive buffer 112, a call detail record buffer 114, a display buffer 115 and a print buffer 117.

The PSK receive buffer 110 includes an identification register 116, an attribute register 118, a plurality of data registers shown generally at 120 and a cyclic redundancy check register 122. The PSK receive buffer 110 is used to receive and store messages received at the PSK modem 93 shown in FIG. 2.

Referring back to FIG. 3, the FSK receive buffer 112 includes a switch to application (STA) register 124, a data link register 126, an application name register 128, an action code register 130, a plurality of data registers shown generally at 132 and a CRC register 134. The FSK receive buffer 112 is used to receive and store messages received at the FSK receiver 104 shown in FIG. 2.

Referring back to FIG. 3, the call detail record buffer 114 includes a called number register 136, a from register 140, date and time registers 144 and 146, a duration register 148, a charge register 150, a payment by register 152 and a rate register 154. The call detail record buffer 114 is used to store call detail information compiled in response to a telephone call made from the pay telephone.

The display buffer 115 is used to hold a bit map of a graphic image for presentation on the display 58 shown in FIG. 2.

Referring back to FIG. 3, the print buffer 117 is used to assemble and hold print commands for driving the printer 60 to print a message or the like.

FIG. 4

Figure 4:
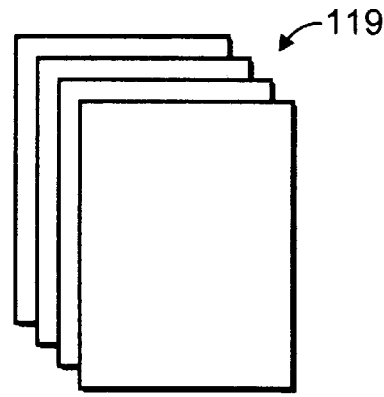
FIG. 4 is a schematic representation of a flash memory configuration, according to the first embodiment of the invention.
Figure 4:
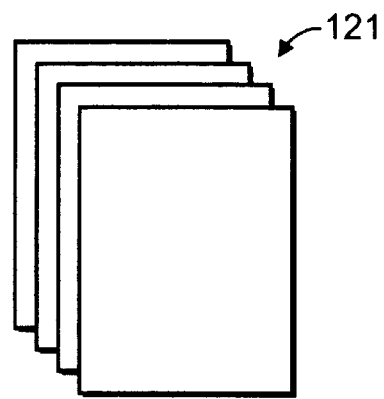
Figure 4:
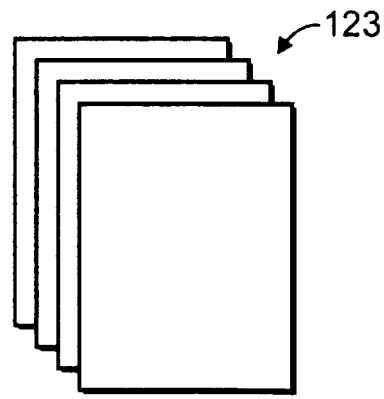
Figure 5:
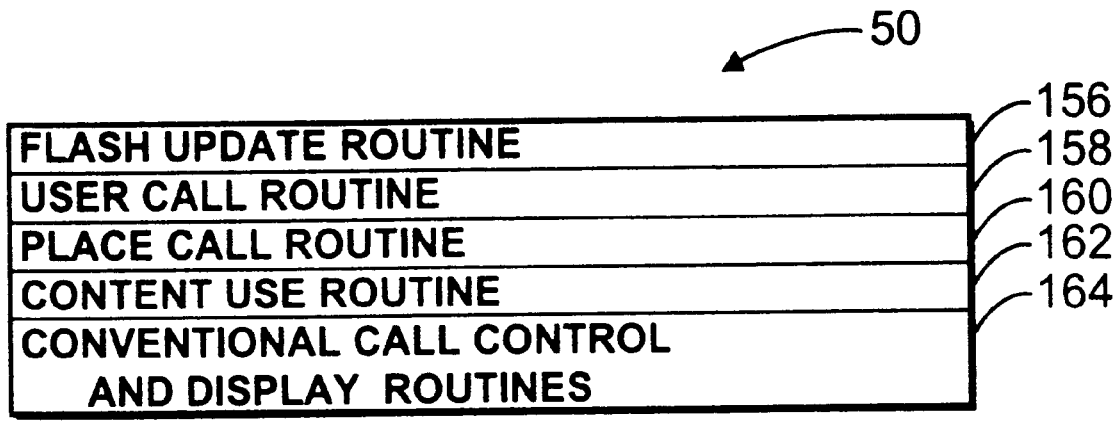
FIG. 5 is a schematic diagram of routines stored in program files in the flash memory shown in FIG. 4.

Referring to FIG. 4, the flash memory is configured to include a display file buffer 119 a program file buffer 121 and a rate table buffer 123. The display file buffer 119, program file buffer 121 and rate table buffer 123 are loaded from data accumulated from the data registers 132 in the FSK receive buffer 112 shown in FIG. 3. The display files are loaded into the display buffer under the control of program files 121.

FIG. 5

Referring to FIG. 4, the program file buffer 121 is preloaded with program codes readable by the second processor 44 for directing the processor to execute various routines for effecting various functions of the telephone. Such codes direct the second processor 44 to execute a flash update routine 156, a user call routine 158, a place call routine 160, a content use routine 162 and conventional call control and display routines 164.

FIG. 6

Flash Update Routine

Figure 6:
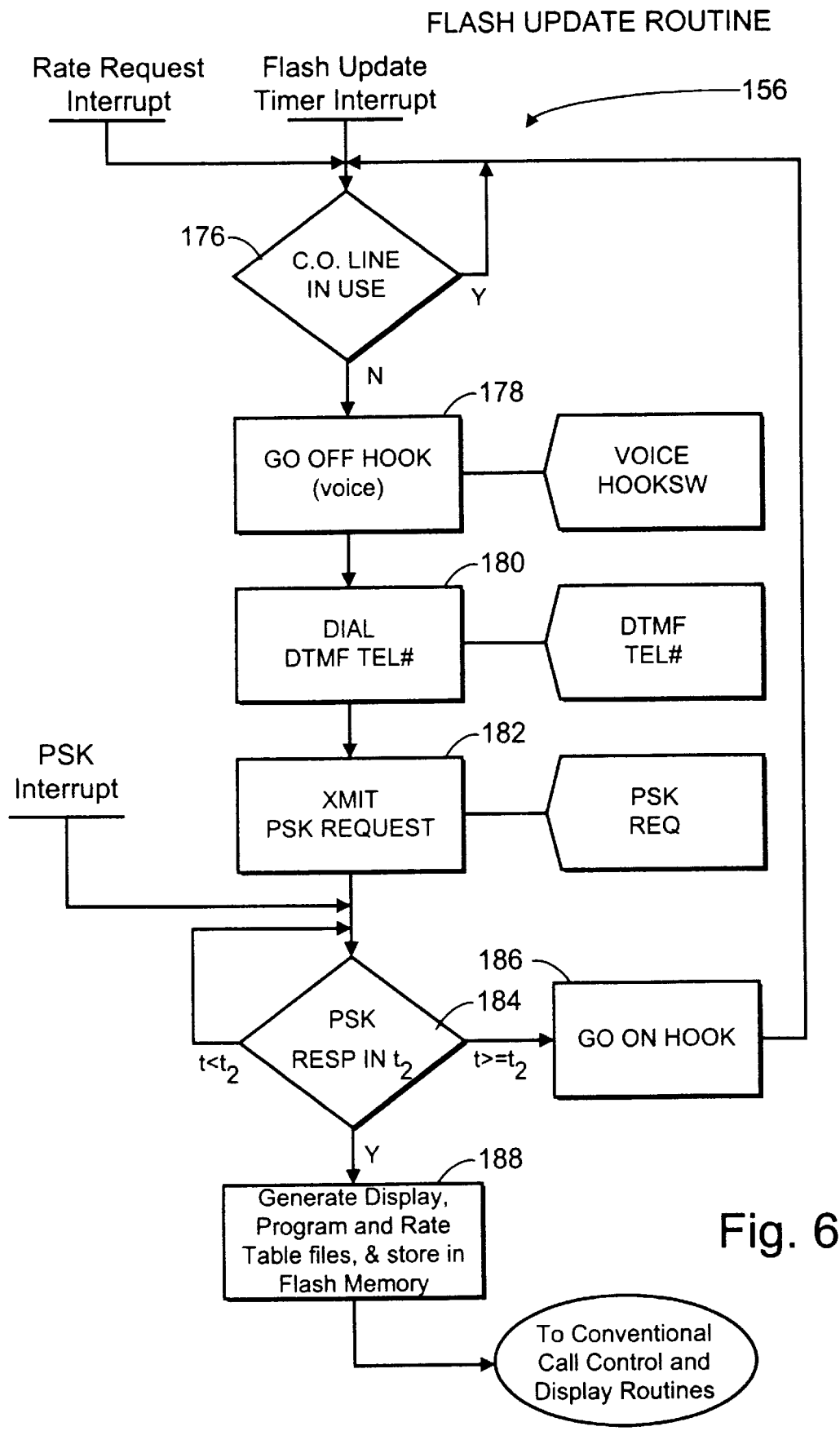
FIG. 6 is flowchart of a flash update routine, according to the first embodiment of the invention.

Referring to FIGS. 2 and 6, the flash update routine is shown generally at 156 and is run on a periodic basis. The flash update routine programs the processor to direct the telephone line interface to place a telephone call to the content server at pre-determined intervals of time which, in this embodiment, is every 24 hours. The flash update routine begins with a first block 176 which directs the processor to determine whether or not the telephone is in use. This is done by determining the state of the voice path hookswitch output 78, which is set to connect the telephone to the central office line 55, according to the conventional call control routines when a user is using the telephone.

If at block 176, the telephone is in use, the flash update routine continues to direct the second processor 44 to execute block 176 to continually determine whether or not the telephone is in use. When the telephone is no longer in use, block 178 directs the second processor 44 to set the voice path hookswitch output 78 active to connect the telephone to the central office line 55. Block 180 then directs the second processor 44 to activate the DTMF output 82 to cause the DTMF transmitter 98 to transmit DTMF signals representing a telephone number of the central payphone server 14 shown in FIG. 1. Thus, the graphical display telephone has a telephone line interface in communication with the processor and the processor is programmed to direct the telephone line interface to place a telephone call on a public switched telephone network to the content server to request the graphical data.

Referring back to FIGS. 2 and 6, block 182 then directs the second processor 44 to set the modem hookswitch output 80 active to close the modem hookswitch 80 to connect the PSK modem 93 to the central office line 55. The voice path hookswitch output 78 is then set inactive to open the voice path hookswitch 74 to disconnect the DTMF transmitter 98 from the central office line 55. The TXD output 83 is then activated with request data representing a request message. In response, the PSK modem transmits a PSK request signal to the central payphone server 14 through the PSTN 16. Thus, the PSK modem acts as a transmitter at, at least, one graphical display telephone for transmitting a request message through the telephone line interface to the content server.

Block 184 then directs the processor to determine whether or not a PSK response has been received from the central payphone server within a predefined time period, $t_2$, at the PSK modem 93.

PSK data is received at the PSK modem 93 and is stored in the PSK receive buffer 110 shown in FIG. 3 such that identification information is stored in the identification buffer, attribute information is stored in the attribute register 118, graphical data is stored in the data registers 120 and cyclic redundancy check (CRC) information is stored in the CRC register 122. The processor then calculates a CRC of its own on the contents of the identification register 116, attribute register 118 and data registers 120 and compares the calculated CRC against the contents of the CRC register 122. When the contents match, a PSK response is, for the purposes of block 184, deemed to have occurred. If a valid CRC is not calculated within a second time $T_2$, block 186 directs the processor to set the modem hookswitch output 80 inactive thereby disconnecting the telephone from the central office line 55 and aborting the call. The flash update routine is, however, restarted at block 176. Thus, the flash update routine persists until PSK response data is received.

When PSK data is deemed to have been received at block 184, the second processor 44 is directed to block 188 which directs it to generate display files, program files or rate tables using the contents of the data registers 120 and to store such display files, program files or rate tables in corresponding buffers shown at 119, 121 and 123 in FIG. 4. The display files are produced in a bit map format, so they can merely be copied directly into the display buffer 115 under the control of program files 121. The display files control individual pixels on the display 58 according to conventional display routines some of such routines cause the graphical data to be displayed on the display at pre-defined periods of time such as heavy traffic periods in a subway station or the like. Thus, each graphical display telephone includes a receiver for receiving graphical data from the graphical content server, memory for storing the graphical data in a display buffer in the telephone and a graphical display for displaying the graphical data stored in the display buffer and the processor is programmed to cause the graphical data to be displayed on the display at pre-defined periods of time.

The program files are in a format readable by the second processor 44 and are able to direct the second processor 44 to execute desired algorithms.

The rate tables are in a format readable by the second processor 44 and are used to determine a rate to be used for calculating charges for caller placed to various numbers.

After executing block 188 of the flash update routine, this routine is completed.

FIG. 7

Figure 7:
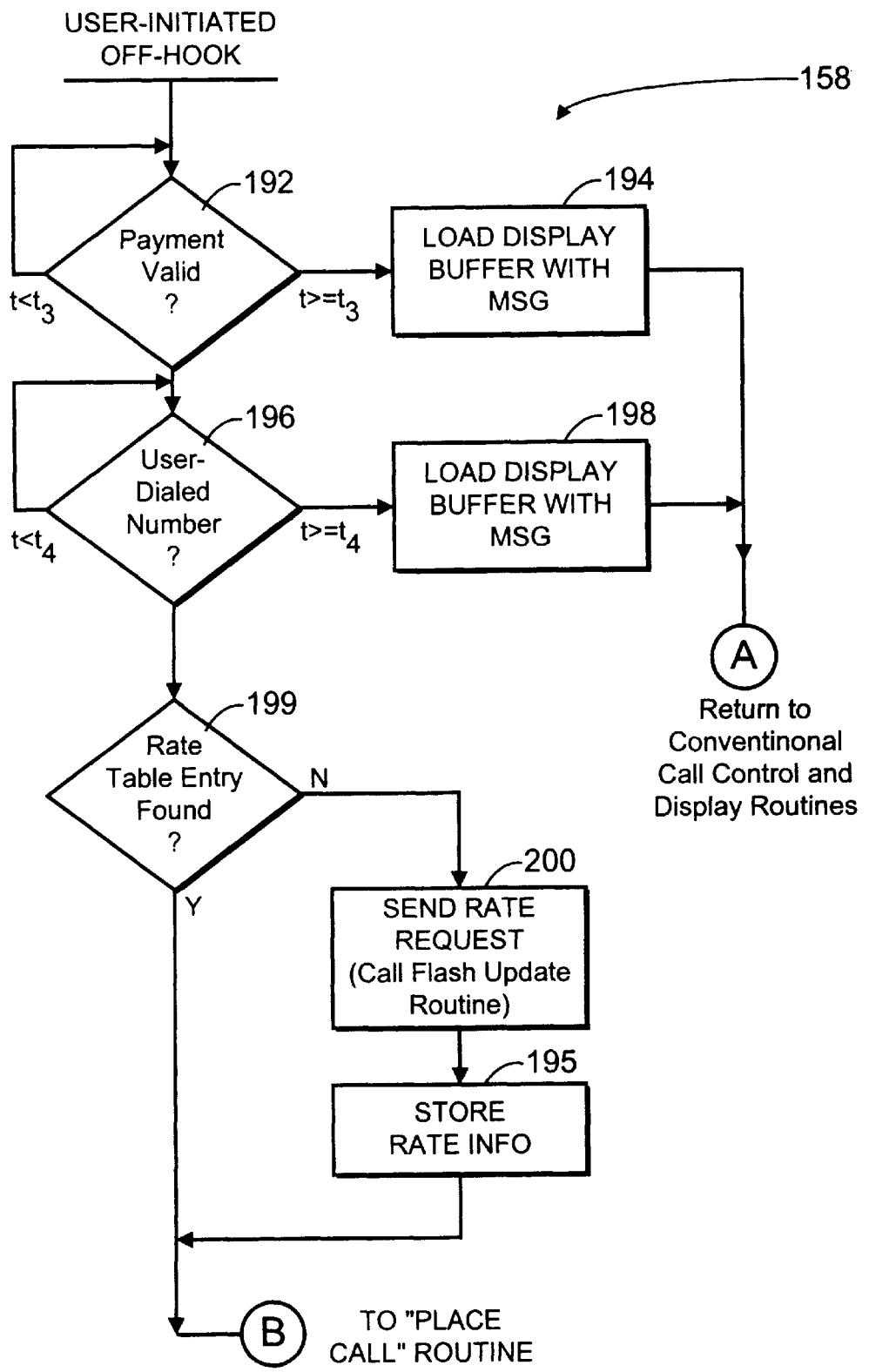
FIG. 7 is a flowchart of a user call routine, according to the first embodiment of the invention.

Referring to FIG. 7, the user call routine is shown generally at 158. This routine is entered upon the user lifting the handset, which according to the conventional call control routines, renders the handset offhook signal active. Block 192 then directs the second processor 44 to determine whether or not a valid payment signal has been received from the payment receiver 62. The second processor 44 remains at block 192 until such valid payment signal is active and if such signal does not become active with a predefined time period, $t_3$, block 194 directs the second processor 44 to load the display buffer 115 with a display file requesting the user to try again and the second processor 44 is directed to return to the conventional call control and display routines 164. Otherwise, if a valid payment signal is detected, the processor is directed to block 196 where it waits for the user to place a call. The user is deemed to have placed a call when a valid telephone number has been dialled on the keypad soft key interpreter 56. The conventional telephone routines provide a flag signal (not shown) indicating whether or not the user has properly entered a valid telephone number.

If at block 196, the user has not placed a call within a time $T_4$, block 198 directs the processor to load the display buffer with a display file from the display file buffer 119, indicating that a call has not been properly placed and the processor is directed to return to the conventional call control and display routines.

If at block 196, the user has dialled a valid telephone number, the second processor 44 is directed to block 199 which directs the second processor 44 to search the rate table buffer 123 for a rate table entry applicable to the number dialled by the user.

If at block 199, no applicable rate table entry is found, the processor is directed to block 200 which directs it to send a rate request to the central payphone server 14. This rate request is made by directing the processor 44 to execute the flash update routine shown in FIG. 6 whereupon the PSK request transmitted at block 182 is a request for rate information. It will be recalled that after executing the flash update routine, the PSK receive buffer is loaded with data, in this instance, representing rate table information.

Referring back to FIG. 7, upon completion of the flash Update Routine called from the user call routine, the processor is directed to block 195 which directs it to store the appropriate rate data for the call, as found in the located rate table, in the rate register 154. In addition, the second processor 44 is directed to load the called number register 136 with the number dialled by the user. In addition, the telephone number of the pay telephone used by the user is stored in the "from" register 140. Finally, the processor is also directed to load an indication of the type of payment (eg. coin, smart card, credit card) and account number, if applicable, into the "payment by" register 152.

Figure 8A:
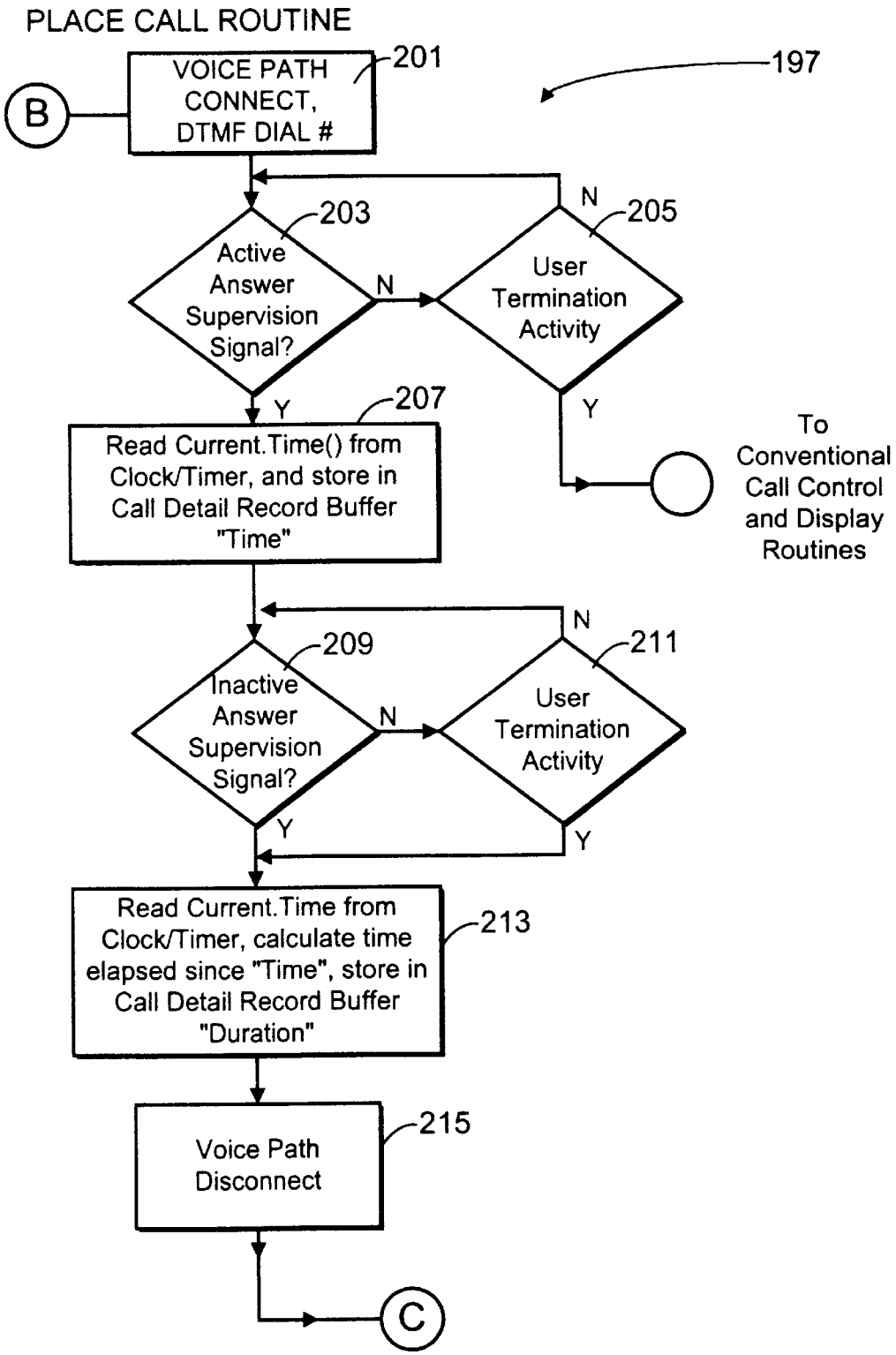
FIG. 8a is a flowchart of a place call routine, according to a first embodiment of the invention.

The processor is then directed to the place call routine shown in FIG. 8.

FIG. 8

The Place Call routine is shown generally at 197 in FIG. 8. This routine begins with a first block 201 which directs the second processor 44 to set the voice path hookswitch output 78 active thereby closing the voice path hookswitch 74 and connecting the voice path defined by input 73 and output 75 to the central office line. Still within block 201, the second processor 44 then controls the DTMF output 82 to cause the DTMF transmitter 98 to transmit the telephone number dialled by the user, over the central office line.

After the number is dialled, block 203 directs the second processor 44 to wait for an active answer supervision signal to be received at the answer supervision signal input 95, from the 2-wire to 4-wire hybrid 72. Until such signal is received, the second processor 44 executes block 205 which directs it to test for call termination hookswitch activity caused by the user hanging up the handset. Such user activity may occur as a result of an abandoned call, for example. If such user activity occurs, the processor is directed to abort the place call routine and return to the conventional call, control and display routines 164.

If, at block 205, no such user activity is detected and an active answer supervision signal is received at block 203, the second processor 44 is directed to block 207.

Block 207 directs the second processor 44 to read the clock timer 66 to determine a current date and time from the clock timer 66. The current date and time values are stored in the date and time registers 144 and 146 of the call detail record buffer 114.

The second processor 44 is then directed to block 209 where it is directed to wait for an inactive answer supervision signal from the 2-wire to 4-wire hybrid 72. If no such inactive answer supervision signal has been received, the second processor 44 is directed to block 211 where it tests for user activity including call termination hookswitch activity caused by the user hanging up the handset or user activity in the form of keypad or softkey presses at the keypad soft key interpreter 56. If call termination activity occurs at block 211, or if an inactive answer supervision signal is received at block 209, the processor is directed to block 213.

Block 213 directs the said processor 44 to again read the clock timer 66, this time to determine a new time value only. The second processor 44 then uses the presently obtained time value with the previously obtained time value as stored in the time register 146, to determine the duration of the call. The duration of the call is then stored in the duration register 148. The second processor 44 then uses the date, time and duration values in conjunction with the data stored in the rate register 154, to determine a charge value to be stored in the charge register 150. The charge value represents the cost of the call or the amount the user will be billed. The loading of the call detail record is thus completed in connection with the call just completed by the user.

The second processor 44 is then directed to block 215, where it sets the voice path hookswitch output 78 inactive thereby opening the voice path hookswitch 74 and disconnecting the telephone from the central office line 55.

Figure 8B:
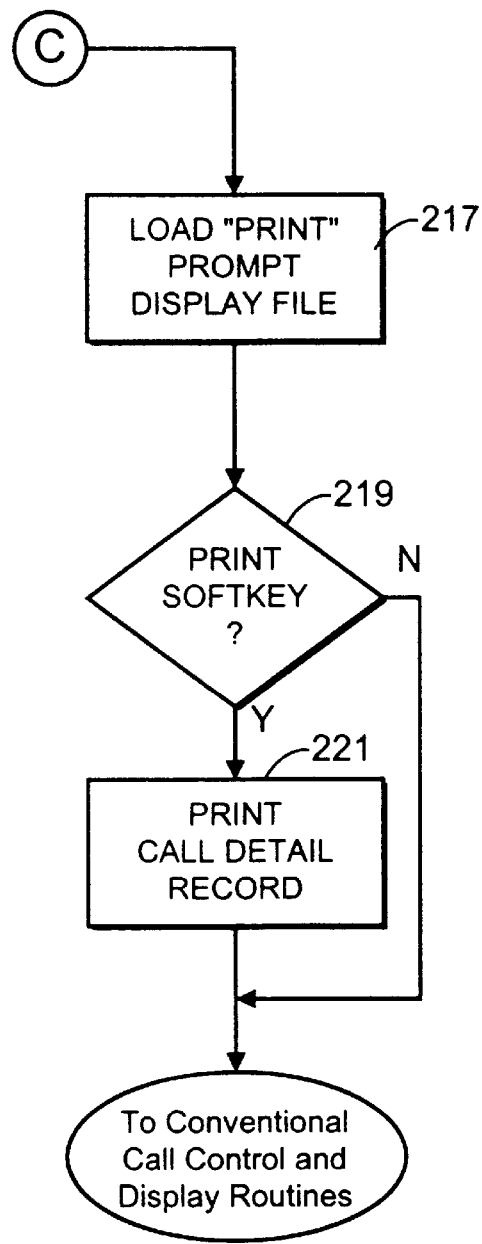
Figure 9:
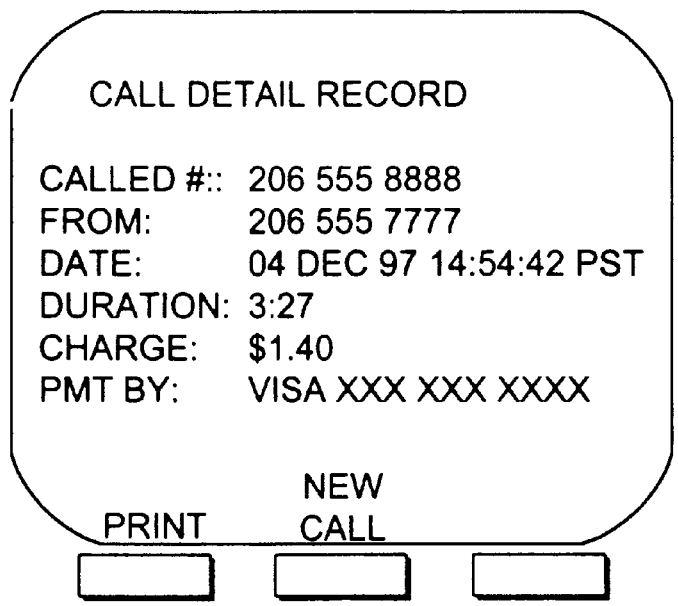
FIG. 9 is a pictorial representation of a call detail record graphic image produced on a display of the apparatus shown in FIG. 2.

Referring to FIG. 8b, block 217 then directs the processor to load into the display buffer 115, a display file from the display file buffer 119, the display file including a prompt message which is displayed on the display 58 as shown in FIG. 9.

The second processor 44 is then directed to block 219 where it waits for the user to press a key on the keypad or softkeys as received at the keypad soft key interpreter 56 shown in FIG. 2. If the user fails to press a keypad or softkey within a predefined period of time, the processor is returned to the conventional call control and display routines 164.

Figure 10:
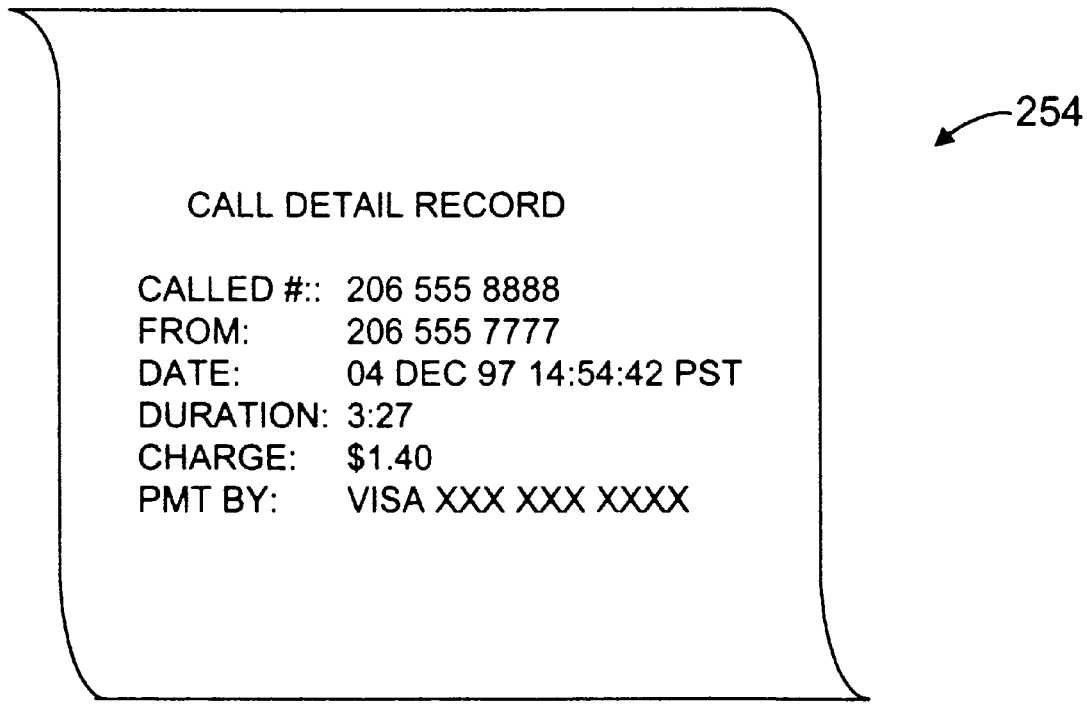
FIG. 10 is a sample called detailed record printed by a printer of the apparatus shown in FIG. 2.

If, however, at block 219, the user activates a key at the keypad soft key interpreter 56, block 221 directs the second processor 44 to load from the program file buffer 121, an appropriate printer driver into the print buffer 117 which directs the printer to print a call detail record including the contents of registers 136 through 154 stored in the called detail record buffer. Such a record is shown generally at 254 in FIG. 10.

Referring back to FIG. 8, if at block 209, the user has called and connected to a telephone service provider as shown at 202 in FIG. 1, such provider may prompt the user, using voice, to enter 1 or 2 etc. to select certain options. For example, if the telephone services provider 202 is a directory assistance centre, the user may be prompted to speak or enter the name of the city of the party he/she wishes to call. Spoken responses are transmitted from the payphone as conventional voice signals. Responses entered through the keypad are transmitted from the payphone as DTMF signals using the DTMF transmitter 98.

The telephone services provider 202 receives the voice response or DTMF signals at a control office interface 204 and provides signals to a call receiver 206. The call receiver 206 communicates the response to a third processor 208 which interprets the response, accesses an appropriate service application 210 and forwards information requested by the user to a transmitter 212. The transmitter formats the information into an extended ADSI message having an action code identifying the ADSI message as relating to directory assistance and data representing the information requested by the user.

In accordance with the ADSI standard, the transmission of an ADSI message is preceded by a CAS tone which is detected by the CAS detector 108, which renders a CAS signal active. This signal is received at the CAS input 92 of the I/O interface 46 and directs the second processor 44 to execute a conventional ADSI message receive routine not shown but contained in the conventional call control and display routines to provide the required CAS response sequence, muting and unmuting of the receive path and reception and storage of the ADSI message in the FSK receive buffer 110 shown in FIG. 3.

FIG. 11

Figure 11:
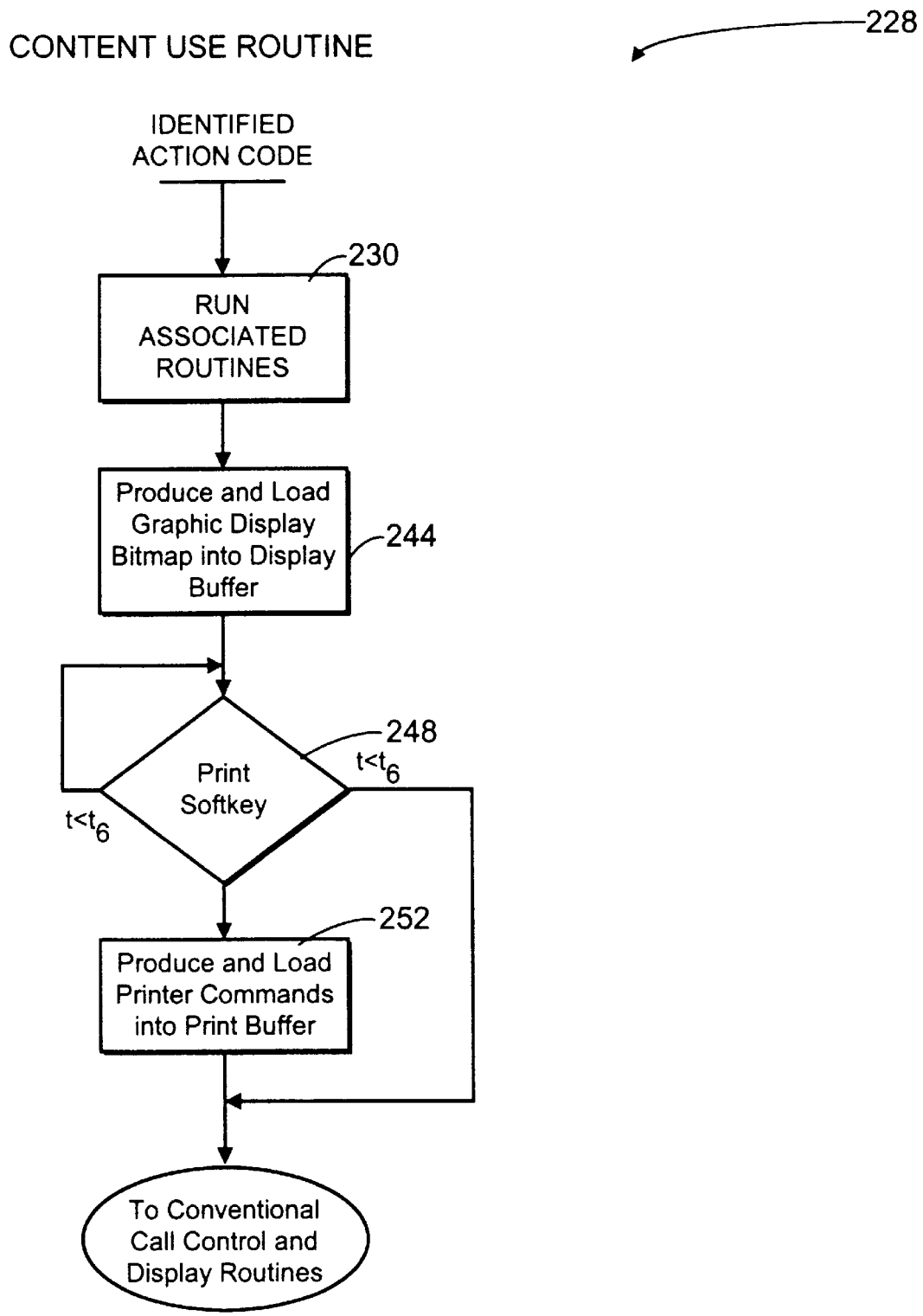
FIG. 11 is a flowchart of a content use routine, according to the first embodiment of the invention.
Figure 12:
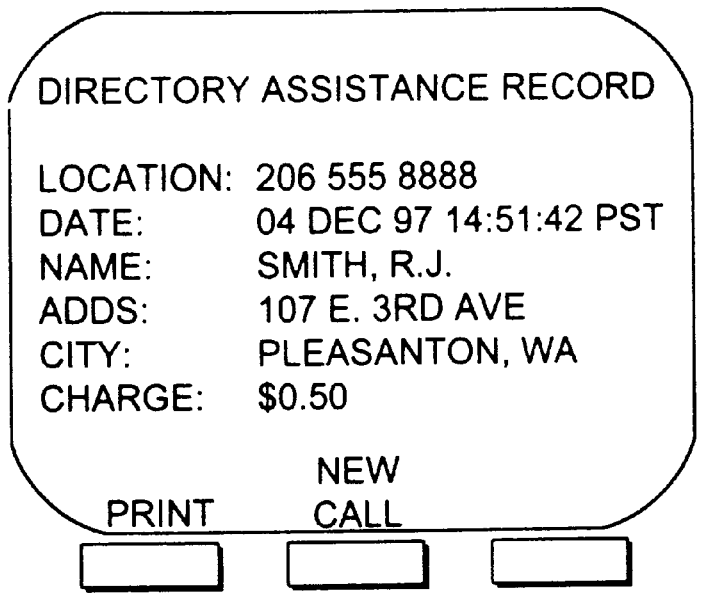
FIG. 12 is a pictorial representation of a graphic display of a directory assistance record produced by the apparatus shown in FIG. 2.

After an ADSI message is received in the FSK receive buffer, the second processor 44 is directed to run the content use routine shown at 228 in FIG. 11.

Referring to FIG. 11, the content use routine 228 begins with a first block 230 which directs the third processor 208 to run executable routines, stored in the program files buffer 121, associated with the action code stored in the action code register 130. In the example presented, the action code relates to directory assistance information, so any executable routines associated with directory assistance activities are executed.

Upon completion of block 230, the second processor 44 is directed to block 244 which directs it to produce and load a graphic display, including the contents of the data registers 132, into the display buffer 115 shown in FIG. 3. Thus, the display buffer 115 is loaded with a bit map including variables from the ADSI message received from the telephone services provider 202, and the conventional call control and display routines produce a display as shown in FIG. 14.

Referring back to FIG. 11, block 248 then directs the processor 208 to read the keypad softkey input on the I/O interface 46 to determine whether or not the user has activated a print softkey. If the user has not activated the print softkey within a pre-specified period of time $T_6$, the second processor 44 is returned to the conventional call control and display routines. Thus, the display is returned to its original state as it was before the user made the call.

Figure 13:
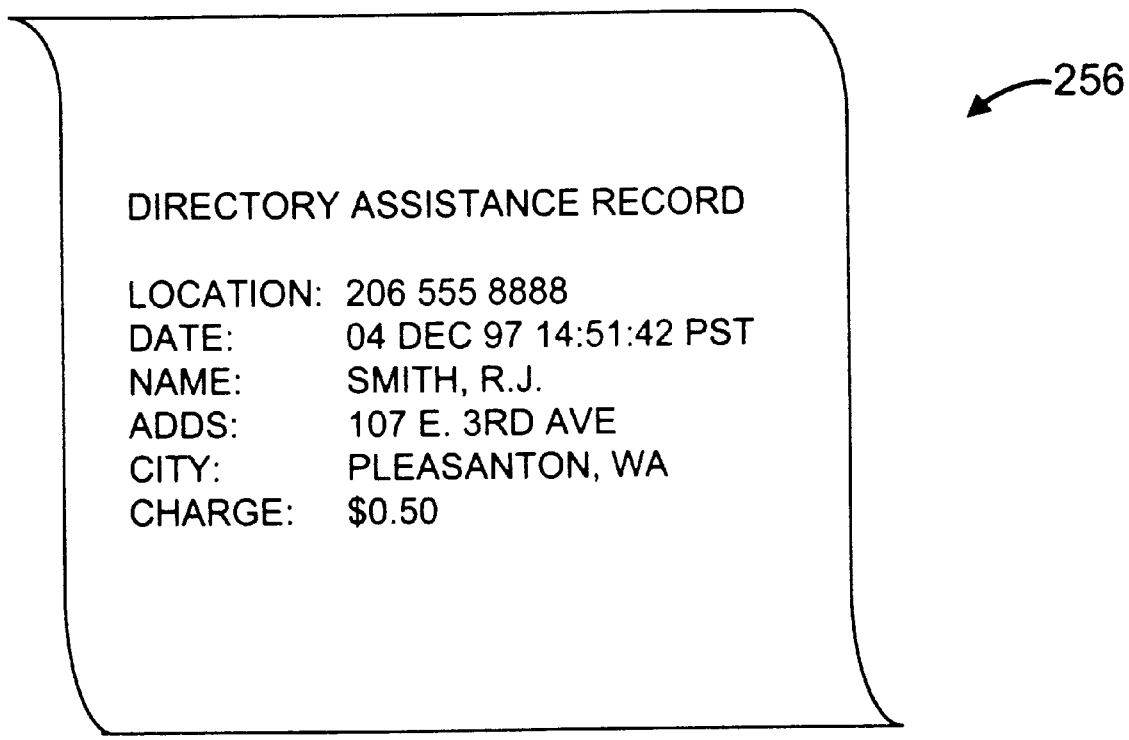
FIG. 13 is a pictorial representation of the printed directory assistance record printed by the apparatus shown in FIG. 2.

If at block 248, the user has activated the print softkey, block 252 directs the second processor 44 to run a printer driver associated with the action code to load the print buffer 117 shown in FIG. 3 with printer commands which activate the printer to print a directory assistance record as shown generally at 256 in FIG. 13, using the data stored in the data registers 132 of the FSK receive buffer 112.

In this manner, a user of a directory assistance provider can receive a printed record providing the telephone number of the party he/she wishes to call.

It will be appreciated that other telephone services providers such as e-mail providers, joke of the day, horoscope and the like can also provide information to one of the plurality of telephones 18 for display in graphical format or for printout.

Alternatively, voice recognition and conventional Interactive Voice Response (IVR) technologies may be used as alternatives to keypad or push buttons for user input.

Operation

While specific embodiments of the invention have been described and illustrated, such embodiments should be considered illustrative of the invention only and not as limiting the invention as construed in accordance with the accompanying claims.

What is claimed is:

1. A method of displaying graphical data associated with a telephony transmission, the method comprising:
   receiving a call that includes graphical data from a content server;
   storing said graphical data in a display buffer in a telephone;
   retrieving said graphical data from said display buffer and displaying said retrieved graphical data in a display on said telephone;
   creating a call detail record in a called detail record buffer in response to activating a user interface within a period of time after said graphical data is displayed, said call detail record being indicative of a duration of said call;
   loading an appropriate printer driver in a printer buffer in response to activating said user interface within said period of time after said graphical data is displayed; and
   directing a printer to print said call detail record from said called detail record buffer in response to said appropriate printer driver being loaded.

2. A method as claimed in claim 1 further including the step of storing said graphical data in a display file.

3. A method as claimed in claim 1 further including the step of displaying said graphical data at pre-defined periods of time.

4. A method as claimed in claim 1 further including the step of placing a telephone call to said content server to request said graphical data.

5. A method as claimed in claim 4 further including the step of placing said telephone call at pre-determined intervals of time.

6. A method as claimed in claim 1 further including the step of receiving said graphical data in a phase shifted keyed format.

7. A method as claimed in claim 1 further including the step of receiving said graphical data in a frame according to a pre-defined protocol including an identifier for identifying said frame as relating to graphical data.

8. A method as claimed in claim 7 further including the step of obtaining and storing said graphical data from said frame.

9. A method as claimed in claim 8 further including the step of obtaining and storing attribute data relating to said graphical data from said frame.

10. An apparatus for displaying graphical data that is associated with a telephony transmission, the apparatus comprising:
    a receiver configured and arranged to receive a call that includes said graphical data from a content server;
    a memory configured and arranged to store said graphical data in a display buffer in a telephone;
    a display configured and arranged to display said graphical data stored in a display buffer;
    a called detail record buffer that creates a call detail record in response to activation of a user interface within a period of time after said graphical data is displayed, said call detail record being indicative of a duration of said call, loading an appropriate printer driver in a printer buffer in response to said activation of said user interface; and
    a printer directed to print said call detail record from said called detail record buffer in response to the loading of said appropriate printer driver.

11. An apparatus as claimed in claim 10 wherein said display buffer includes a display file.

12. An apparatus as claimed in claim 10, further including a processor programmed to cause said graphical data to be displayed on said display at pre-defined periods of time.

13. An apparatus as claimed in claim 12 further including a telephone line interface in communication with said processor, said processor being programmed to direct said telephone line interface to place a telephone call to said content server to request said graphical data.

14. An apparatus as claimed in claim 13 wherein said processor is programmed to direct said telephone line interface to place said telephone call to said content server at pre-determined intervals of time.

15. An apparatus as claimed in claim 14 further including a transmitter for transmitting a request message through said telephone line interface to said content server.

16. An apparatus as claimed in claim 15 wherein said receiver receives said graphical data in a phase shift keyed format.

17. A method of displaying graphical information at a plurality of sites, the method comprising:
    transmitting a message indicative of a data field that has a bit map file associated with graphical information and an identifier field that identifies said message as a graphical or rate table message which is associated with said graphical information;
    controlling pixels on a display of graphical display telephones in accordance with said bit map file wherein said graphical display telephones are located in at least one of said plurality of sites;
    creating graphical content files based on said identifier field and said data field that define said graphical information to be displayed at least one of said plurality of sites; and
    transmitting said graphic content files to at least one of said graphical display telephones.

18. A method as claimed in claim 17 further including the step of transmitting said graphical content files over a public switched telephone network.

19. A method as claimed in claim 17 wherein the step of creating graphical content files includes the step of creating bit-mapped graphical content files.

20. A method as claimed in claim 18 further including the step of receiving a request for graphical content from at least one of said telephones and performing the step of transmitting said graphical content files in response to said request for graphical content.

21. A method as claimed in claim 17 further including the step of establishing a telephone call between a graphical content provider and at least one graphical display telephone.

22. A method as claimed in claim 17 further including the step of associating said graphical content files with respective graphical display telephones.

23. An apparatus for displaying graphical information at a plurality of sites, the apparatus comprising:

a transmitter for transmitting a message indicative of a data field that has a bit map file which is associated with graphical information and an identifier field that identifies said message as a graphical or rate table message which is associated with said graphical information;

a plurality of graphical display telephones includes a display wherein said graphical display telephones controls pixels in accordance with said bit map file, wherein said graphical display telephones are located on at least one of said plurality of sites;

a processor configured and arranged to create graphical content files based on said identifier field and said data field that define said graphical information to be displayed on at least one of said plurality of sites; and a transmitter configured and arranged to transmit said graphical content files to at least one of said graphical display telephones at least one of said plurality of sites.

24. An apparatus as claimed in claim 23 wherein said transmitter is operable to establish a telephone call to at least one of said graphical display telephones on a public switched telephone network.

25. An apparatus as claimed in claim 23 wherein said graphical content files include bit-mapped graphical content files.

26. An apparatus as claimed in claim 23 further including a receiver for receiving a request for graphical content from at least one of said telephones, said processor being programmed to transmit at least one of said graphical content files to said at least one of said telephones in response to receiving said request for graphical content.

27. An apparatus as claimed in claim 23 wherein said processor is programmed to associate said graphical content files with respective graphical display telephones.

28. A method of displaying graphical information at a plurality of sites, the method comprising:

transmitting a message indicative of a data field that has a bit map file associated with graphical information, and an identifier field that identifies said message as a graphical or rate table message which is associated with said graphical information;

creating graphical content files based on said identifier field and said data field that define said graphical information to be displayed on at least one of said plurality of sites;

transmitting said graphical content files to at least one of said graphical display telephones at least one of said plurality of sites, from a graphical content server;

receiving said graphical content files from said content server at said graphical display telephones at least one of said plurality of sites;

storing said graphical content files in a display buffer of at least one of said graphical display telephones; and displaying said graphical content files stored in said display buffer of at least one of said graphical display telephones by controlling pixels of said display in accordance with said bit map file.

29. A method as claimed in claim 28 further including the step of storing said graphical data at said graphical display telephone in a display file.

30. A method as claimed in claim 28, further including the step of displaying said graphical data at said graphical display telephone at pre-defined periods of time.

31. A method as claimed in claim 28 further including the step of placing a telephone call from at least one of said graphical display telephone to said graphical content server to request said graphical data.

32. A method as claimed in claim 31 further including the step of placing said telephone call at pre-determined intervals of time.

33. A method as claimed in claim 28 further including the step of receiving s aid graphical data at said graphical display telephone in a phase shifted keyed format.

34. A method as claimed in claim 28 further including the step of receiving at said graphical display telephone said graphical data in a frame according to a pre-defined protocol including an identifier for identifying said frame as relating to graphical data.

35. A method as claimed in claim 34 further including the step of obtaining and storing said graphical data from a frame.

36. A method as claimed in claim 35 further including the step of obtaining and storing attribute data relating to said graphical data from a frame.

37. A method as claimed in claim 28 further including the step of transmitting said graphical content files from said graphical content server over a public switched telephone network.

38. A method as claimed in claim 28 wherein the step of creating includes the step of creating bit-mapped graphical content files at said graphical content server.

39. A method as claimed in claim 37 further including the step of receiving a request for graphical content at said graphical content server, from at least one of said graphical display telephones and performing the step of transmitting in response to said request for graphical content.

40. A method as claimed in claim 28 further including the step of establishing from at least one of said graphical display telephone a telephone call to said graphical content provider.

41. A method as claimed in claim 28 further including the step of associating said graphical content files with respective graphical display telephones, at said graphical content server.

42. An apparatus for displaying graphical information at a plurality of sites, the apparatus comprising:

a transmitter for transmitting a message indicative of a data field that has a bit map file which is associated with graphical information, and an identifier field that identifies said message as a graphical or rate table message which is associated with said graphical information;

a graphical content server including:

a processor configured and arranged to create graphical content files based on said identifier field and said data field that define said graphical information to be displayed on at least one of said plurality of sites;

a transmitter configured and arranged to transmit said graphical content files to respective ones of graphical display telephones at said plurality of sites; and a plurality of graphical display telephones, each of said graphical display telephones including:

a receiver configured and arranged to receive said graphical content files from said graphical content server;

a memory configured and arranged to store said graphical content files in a display buffer in said respective ones of said graphical display telephone; and a graphical display configured and arranged to display said graphical content files stored in said display buffer by controlling pixels of said display in accordance with said bit map file.

43. An apparatus as claimed in claim 42 wherein said display buffer includes a display file.

44. An apparatus as claimed in claim 42, further including a processor at, at least, one graphical display telephone programmed to cause said graphical data to be displayed on said display at pre-defined periods of time.

45. An apparatus as claimed in claim 44 further including a telephone line interface at, said at least one graphical display telephone in communication with said processor, said processor being programmed to direct said telephone line interface to place a telephone call to said content server to request said graphical data.

46. An apparatus as claimed in claim 45 wherein said processor is programmed to direct said telephone line interface to place said telephone call to said content server at pre-determined intervals of time.

47. An apparatus as claimed in claim 46 further including a transmitter at, at least, one graphical display telephone for transmitting a request message through said telephone line interface to said content server.

48. An apparatus as claimed in claim 47 wherein said receiver at said graphical display telephone receives said graphical data in a phase shift keyed format.

49. An apparatus as claimed in claim 47 wherein said transmitter at said graphical display telephone is operable to establish a telephone call to at least one of said graphical display telephones on a public switched telephone network.

50. An apparatus as claimed in claim 42 wherein said graphical content files include bit-mapped graphical content files.

51. An apparatus as claimed in claim 42 further including a receiver at said graphical content server for receiving a request for graphical content from at least one of said telephones, said processor at said graphical content server, being programmed to transmit at least one of said graphical content files to said at least one of said graphical display telephones in response to receiving said request for graphical content.

52. An apparatus as claimed in claim 42 wherein said processor at said graphical content server is programmed to associate said graphical content files with respective graphical display telephones.

53. An apparatus for target graphical advertising with respect to a telephony device comprising:

a central payphone server including a processor which includes a memory that includes a link table and graphical content files;

said processor is configured to receive a call detail record which is indicative of a duration of a call to a central payphone server, a date associated with said call and a payment associated with said call to said central payphone server which creates said graphical content files; and a transmitter selectively coupling said central payphone server to a plurality of telephony devices such that said graphical content files can be transmitted from said central payphone serves to said plurality of telephony devices by use of said link tables that correlate said graphical content files to said plurality of telephony devices in response to a user interface.

54. The apparatus of claim 53, further comprising producing a printed copy of said call detail record.

* * * * *